United States Patent [19]
Kessler et al.

[11] Patent Number: 6,127,820
[45] Date of Patent: Oct. 3, 2000

[54] PROCESS AND CIRCUIT ARRANGEMENT FOR DETERMINING THE SPEED OF A D.C. MOTOR WITHOUT A SPEEDSENSOR

[75] Inventors: Martin Kessler, Buehl; Karl-Heinrich Preis, Buehlertal, both of Germany

[73] Assignee: Robert Bosch GmbH, Stuttgart, Germany

[21] Appl. No.: 08/981,662

[22] PCT Filed: May 4, 1996

[86] PCT No.: PCT/DE96/00778

§ 371 Date: Jan. 8, 1998

§ 102(e) Date: Jan. 8, 1998

[87] PCT Pub. No.: WO97/03364

PCT Pub. Date: Jan. 30, 1997

[30] Foreign Application Priority Data

Jul. 8, 1995 [DE] Germany ............... 195 24 913

[51] Int. Cl.[7] ............... G01P 3/46

[52] U.S. Cl. ............... 324/177
[58] Field of Search ............... 324/177, 225; 361/24, 25; 318/641; 310/68 C

[56] References Cited

U.S. PATENT DOCUMENTS

4,246,536  1/1981  Bradley et al. ............... 324/177

OTHER PUBLICATIONS

Elektronik 1, Jan. 13, 1994, pp. 40–41.

*Primary Examiner*—Walter E. Snow
*Attorney, Agent, or Firm*—Venable; Norman N. Kunitz; Allen Wood

[57] ABSTRACT

A process and circuit arrangement are disclosed for determining the speed of a direct current motor (10). The motor data influencing the speed (n) of the motor (10) depend on the operating state of the motor (10), and this dependence is compensated during operation the direct current motor (10) operation during determination of the speed (n).

8 Claims, 1 Drawing Sheet

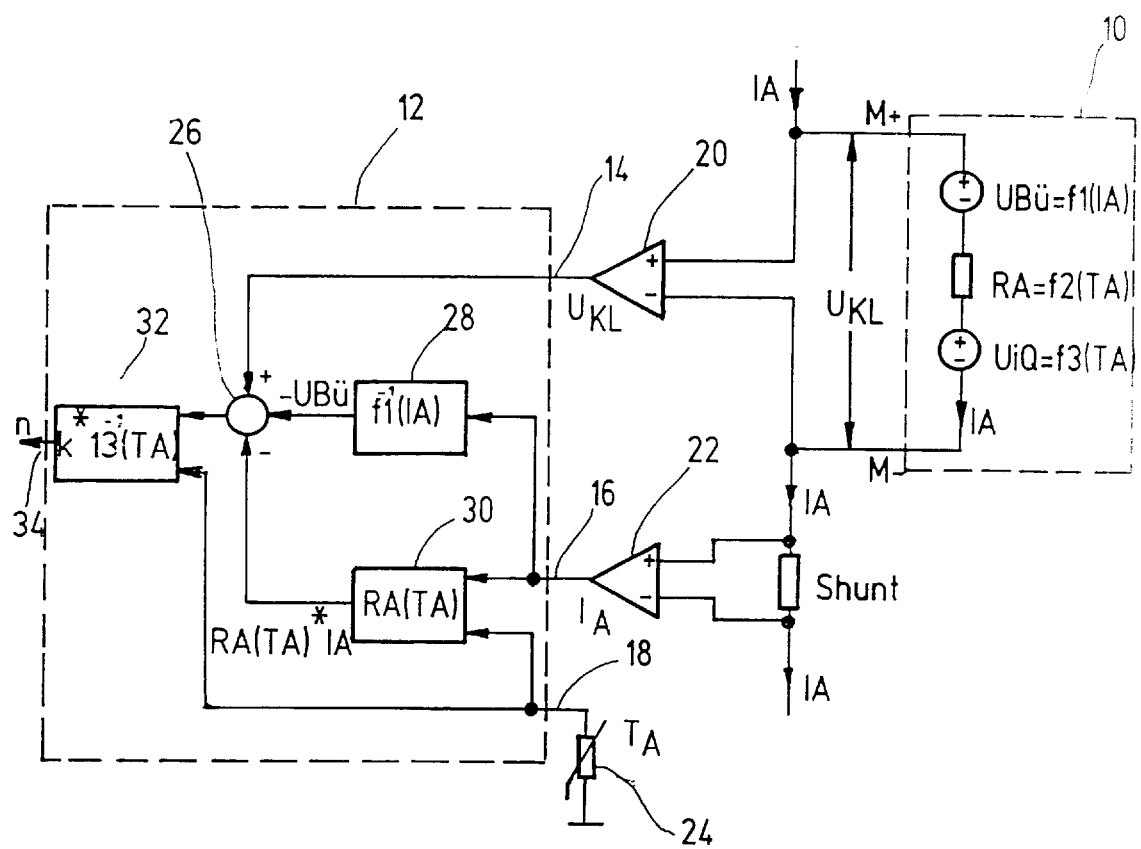

PROCESS AND CIRCUIT ARRANGEMENT FOR DETERMINING THE SPEED OF A D.C. MOTOR WITHOUT A SPEEDSENSOR

BACKGROUND OF THE INVENTION

The invention concerns a process for determining the speed of a direct current motor and a circuit arrangement for carrying out this process.

It is known that direct current motors are used for many applications where particular importance is assigned to the actual speed or a speed regulation of the direct current motor. Thus, direct current motors are used, for example, as adjustment motors in motor vehicles, e.g. for a seat adjustment, for opening windows, for sliding roofs and sun roofs, for ventilators, fans, windshield wipers etc. In order to determine the speed of direct current motors, it is known to assign a speed sensor to these, by means of which the rotational movement of an armature shaft of the direct current motor is detected. A measuring signal that is proportional to the speed and is separated by the speed sensor can then be processed further. The DE-OS 42 16 040, for example, shows that it is known to use a measuring signal, detected in this way and proportional to the speed, for monitoring a direct current motor for thermal overload. However, it is a disadvantage in this case that the arrangement of the additional speed sensor complicates the design of the direct current motor.

In the electrical engineering field in general, it is known that the rotational speed of a direct current motor is proportional to the source voltage, which is induced in its armature during the operation of the direct current motor. An error occurs during the transition from induced source voltage/direct current motor speed as a result of a temperature dependence of the magnetic flow. Further momentary operating states of the direct current motor, which actually occur, such as a fluctuating supply voltage, a changing load moment, lead to a distortion of the determination of the induced source voltage. On the whole, this leads to an incorrect determination of the actual speed for the direct current motor.

The publication Elektronik 1, Jan. 13, 1994, pages 40 to 41, shows that it is known to regulate the speed of a direct current motor. The actual speed of the direct current motor, in this case, is measured by way of a generator voltage that is proportional to the speed, that is to say without a speed sensor.

SUMMARY OF THE INVENTION

An object of the invention is to make it possible to obtain a correct determination of the actual speed. According to the invention, the dependence of the motor data or factors influencing the speed on an operating state of the direct current motor is compensated during the direct current motor operation for determining the speed. Accordingly, it is advantageously possible to take into account preferably a temperature dependence for specific motor data, in that the change in the motor data occurring as a result of the temperature dependence is taken into account when determining the actual direct current motor speed.

The circuit arrangement according to the invention has the advantage that a correct determination of the actual speed of the direct current motor is possible in a simple way by means of generally existing controls, preferably electronic control devices in motor vehicles. Owing to the fact that a correction circuit is provided, which corrects the measuring signals, determined by the measuring elements and proportional to the motor data, by a distortion of the measuring signals that occurred as a result of the actual operating state, an output signal is present at the circuit arrangement, which corresponds to the actual, momentary speed of the direct current motor. As a result of the signal, which is then present and corresponds to the actual speed, it is possible with the aid of adjustment drives to perform exact adjustment operations with the direct current motor. Deviations in the adjustment that occur as a result of an incorrect determination of the speed can thus be avoided.

Advantageous embodiments of the invention follow from the characteristics named in the dependent claims.

BRIEF DESCRIPTION OF THE DRAWING

The invention is explained in the following in more detail with an embodiment and with the aid of the associated drawing, which shows a block diagram for determining the speed of a direct current motor.

DESCRIPTION OF THE PREFERRED EMBODIMENT

The FIGURE shows a basic circuit for detecting the speed of a direct current motor. The direct current motor 10 is here shown with an equivalent circuit diagram. Essential motor data or factor for the direct current motor 10 are illustrated with the aid of the equivalent circuit diagram. As a result of the known brush voltage effect, a voltage drop $U_{Bü}$ is not proportional to an armature current $I_A$, so that the dependent function $U_{Bü}=f1\,(IA)$ results. It is furthermore known that an armature resistance $R_A$ of the armature winding is temperature-dependent on the armature temperature $T_A$, owing to the positive temperature coefficient of the copper material used. This results in a second dependent function $R_A=f2\,(T_A)$. It is also known that the induced armature voltage (source voltage) $U_{iQ}$ is temperature dependent as well, owing to the fact that the magnetic flow of the motor is subject to a negative temperature coefficient. A third dependent function follows from this $U_{iQ}=f3\,(T_A)$. During the operation of the direct current motor 10, the terminal voltage $U_{KL}$ is present between its motor terminals M+ and M−. The armature current $I_A$ flows at the same time via the armature. The armature current $I_A$ level is determined by the resistance moment of the direct current motor. The armature current $I_A$ is driven from the electrical side by the sum with operational sign of terminal voltage $U_{KL}$ and induced voltage $U_{iQ}$. If the armature current $I_A$ changes with the load, then the speed n and the induced armature voltage $U_{iQ}$ evade, so that the current in the stationary operation always meets both requirements. This results in the following equations $$n = k \cdot U_{iQ} = k \cdot (U_{KL} - I_A \cdot R_A)$$

Here, k refers to a motor constant.

Owing to a fluctuating supply voltage, a change in the load moment of the direct current motor and a change in the armature temperature, a sufficiently correct determination of the direct current motor speed n is not possible because of this relation.

The correction circuit, which here is on the whole referred to as 12, is provided to compensate the dependence of the motor data influencing the speed n, namely the brush voltage drop $U_{Bü}$, the armature resistance $R_A$ and the induced armature voltage $U_{iQ}$, during a change in the operating state. The correction circuit 12 comprises a first input 14, a second input 16 and a third input 18. The first input 14 is connected to a measuring element 20 that is designed an operational amplifier and which supplies a measuring signal corresponding to the terminal voltage $U_{KL}$. The second input 16 is connected to a second measuring element 22, which is also designed an operational amplifier and which supplies a measuring signal corresponding to the armature current $I_A$. The third input 18 is connected to a temperature sensor 24, which supplies a measuring signal corresponding to the armature temperature $T_A$. The temperature sensor 24 in this case is installed in a suitable location on the direct current motor 10, in order to supply a measuring signal to the input 18 that corresponds at least approximately to the actual armature temperature $T_A$.

The correction circuit 12 has a subtracter 26, a first function unit 28, a second function switch 30 as well as a third function unit 32.

The measuring signal corresponding to the armature current $I_A$ is supplied to the first function unit 28, where an inverse function of the brush voltage effect $U_{Bü}$ is simulated. The signal corresponding to the inverse function is supplied by the function unit 28 to the subtracter 26 and is subtracted there from the signal corresponding to the terminal voltage $U_{KL}$.

The signals at inputs 16 and 18, which correspond to the armature current $I_A$ and the armature temperature $T_A$, are supplied to the second function unit 30. The function switch 30 in this case compensates the temperature dependence of the armature resistance $R_A$ and supplies a product of the compensated armature resistance $R_A$ and the armature current $I_A$. This product is also fed to the subtracter 26 and is subtracted from the signal for the terminal voltage $U_{KL}$. The differential value of the subtracter 26 and the measured value corresponding to the armature temperature $T_A$ are supplied to the third function unit 32. This unit compensates the temperature dependence of the induced voltage $U_{iQ}$ and multiplies the resulting value with the motor constant k.

Thus, a measuring signal corresponding to the speed n is present at one output 34 of the correction circuit 12, for which irregularities resulting from changing operating states during the operation of the direct current motor 10 are compensated. The measuring signal corresponding to the speed n thus reflects the correct, actual speed n of the direct current motor 10.

What is claimed is:

1. A process for determining the speed of a direct current motor having an operating state and having motor data that influence the speed and depend on the operating state, comprising the steps of:
   (a) measuring parameters indicative of the operating state of the motor, the measured parameters including the temperature the motor; and
   (b) determining, from the parameters measured in step (a), motor data that are compensated for the operating state of the motor, the speed of the motor being calculated from the compensated motor data,
   wherein the motor data include the ohmic resistance ($R_A$) of the armature of the motor, the induced armature voltage ($U_{iQ}$), and the brush voltage effect ($R_{Bü}$), and wherein the temperature dependence of the induced armature voltage ($U_{iQ}$) and the ohmic resistance ($R_A$) of the armature as well as the brush voltage effect ($R_{Bü}$) of the motor are compensated in step (b).

2. A process according to claim 1, wherein if a change in the temperature of the motor is measured during step (a), the change in temperature is taken into account in step (b).

3. A process according to claim 1, wherein the compensation of the brush voltage effect ($U_{Bü}$) comprises simulating the inverse function of the brush voltage effect ($U_{Bü}$), the simulated inverse function being used for the compensation.

4. A circuit arrangement for determining the speed of a direct current motor having an operating state and having motor data that influence the speed and depend on the operating state, comprising:
   measuring elements that measure parameters indicative of the operating state of the motor, the measuring elements producing measuring signals; and
   correction circuit means for calculating the speed of the motor from the measured parameters, the correction circuit means including means for correcting the measuring signals ($I_A$, $U_{KL}$) that are determined by the measuring elements and are proportional to the motor data,
   wherein the measuring elements include a temperature sensor (24), which supplies a measuring signal that corresponds to the armature temperature ($T_A$) of the direct current motor, the measuring signal of the temperature sensor being supplied to the correction circuit means.

5. A circuit arrangement for determining the speed of a direct current motor having an operating state and having motor data that influence the speed and depend on the operating state, comprising:
   measuring elements that measure parameters indicative of the operating state of the motor, the measuring elements producing measuring signals; and
   correction circuit means for calculating the speed of the motor from the measured parameters, the correction circuit means including means for correcting the measuring signals ($I_A$, $U_{KL}$) that are determined by the measuring elements and are proportional to the motor data,
   wherein the measuring elements include a measuring element that produces a measuring signal corresponding to the armature current ($I_A$), and wherein the means for correcting comprises a first function unit (28), which is connected to the measuring element (22) that supplies a measuring signal corresponding to the armature current ($I_A$) and which simulates an inverse function of the brush voltage effect ($U_{Bü}$).

6. A circuit arrangement according to claim 5, wherein the measuring elements additionally include a temperature sensor (24), and wherein the means for correcting further comprises a second function unit (30), connected to the measuring element (22) that produces a measuring signal corresponding to the armature current ($I_A$) and to the temperature sensor (24), that supplies a product of the corrected armature resistance ($R_A$) and the armature current ($I_A$).

7. A circuit arrangement according to claim 6, wherein the measuring elements additionally include a measuring element (20) that supplies a measuring signal corresponding to a terminal voltage ($U_{KL}$), and wherein the means for correcting further comprises a subtracter (26), which is connected to the measuring element (20) that supplies the measuring signal corresponding to the terminal voltage ($U_{KL}$) and to the first and second function units (28, 30), the subtracter (26) generating a subtracter output signal corresponding to the terminal voltage ($U_{KL}$) minus the brush voltage effect ($V_{Bü}$) and minus the product of the corrected armature resistance ($R_A$) and the armature current ($I_A$).

8. A circuit arrangement according to claim 7, wherein the means for correcting further comprises a third function unit (32), which receives the subtracter output signal and an output signal from the temperature sensor (24), and which corrects the temperature dependence of the the subtracter output signal, the subtracter output signal corresponding to the induced voltage ($U_{iQ}$) of the motor.

* * * * *